Sept. 20, 1971     P. SALERNO ET AL     3,605,947
DEVICE USED IN INSTALLING CABLES IN CONDUITS
Filed July 22, 1970
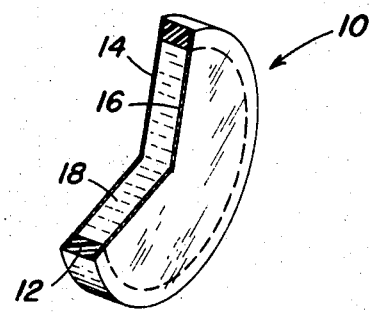
Fig. 1.
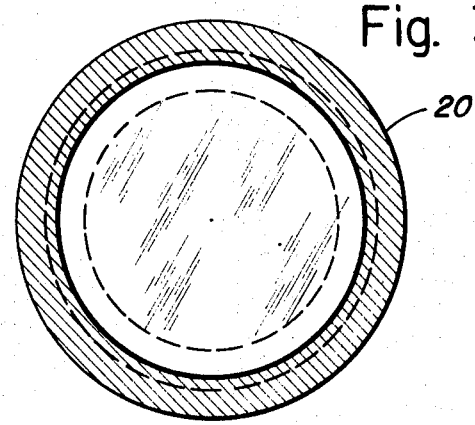
Fig. 3
Fig. 2.
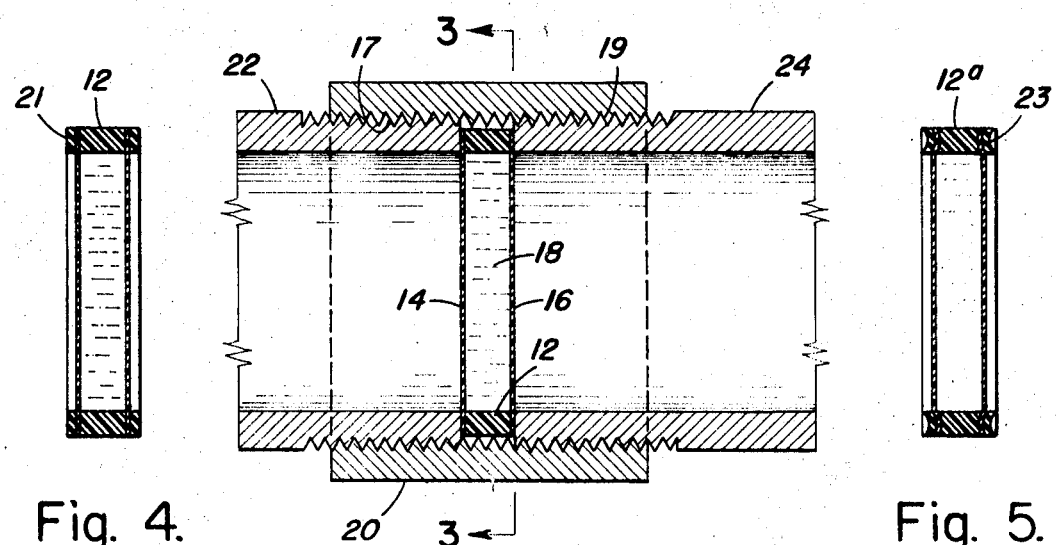
Fig. 4.     Fig. 5.
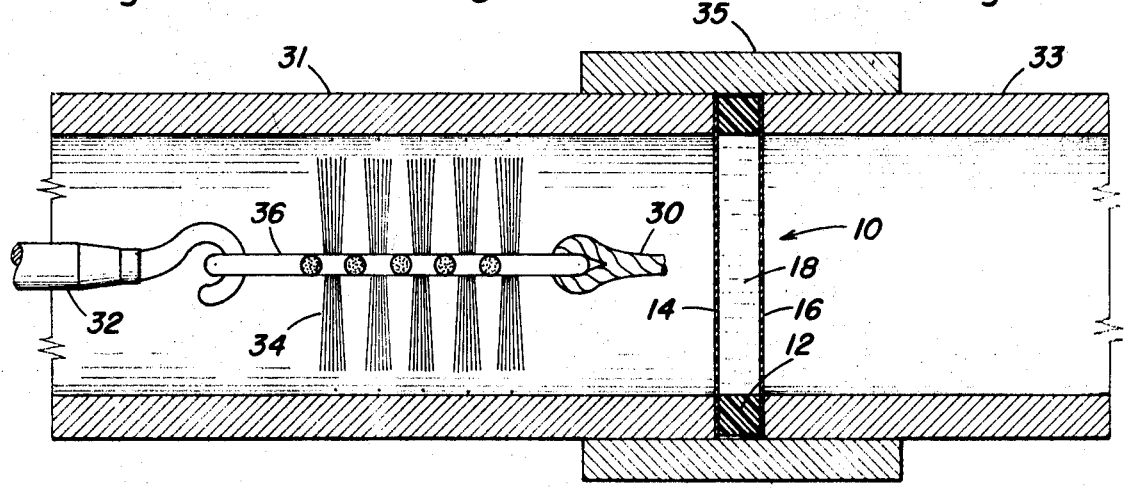
Fig. 6.
INVENTORS
Phillip Salerno
Michael Sammaritano
BY    *Frank J. Jordan*
ATTORNEY United States Patent Office 3,605,947
Patented Sept. 20, 1971

3,605,947
DEVICE USED IN INSTALLING CABLES IN CONDUITS
Phillip Salerno, 7208 Ave. W., Brooklyn, N.Y. 11234, and Michael Sammaritano, 910 Manor Lane, Bayshore, N.Y. 11706
Continuation-in-part of application Ser. No. 23,346, Mar. 27, 1970. This application July 22, 1970, Ser. No. 57,268
Int. Cl. F16n 1/00
U.S. Cl. 184—15R
11 Claims

ABSTRACT OF THE DISCLOSURE

A conduit in which an electrical cable or the like is to be installed has rupturable containers of lubricant installed therein. The containers are broken during installation of the electrical cable thereby releasing the lubricant in the conduit and reducing the friction of the electrical cable and otherwise facilitating pulling of the cable through the conduit.

BACKGROUND OF THE INVENTION

This is a continuation-in-part application of our prior application Ser. No. 23,346 filed Mar. 27, 1970.

Construction of electrical facilities in buildings, and underground in city streets, public facilities, military installations and the like involves initially installing a conduit which is to house the electrical cable. After the conduit is installed, a snake such as a long length of fiberglass or spring steel is pushed through the conduit and is used to pull a wire or nylon rope through the conduit. The end of an electrical cable is secured to one end of the rope and the other end of the latter is pulled through, thereby pulling the length of cable into the conduit where its ends are ultimately hooked up in junction boxes or other devices and equipment to complete the electrical installation.

Frequently, the conduit has a tortuous path formed by fittings, usally 45 and 90 degree elbows, so that it requires a large pulling force to pull the electrical cable through the conduit. The more fittings in a particular section of conduit, the more tortuous the path and the greater the pulling force required. Frequently the printing on the cable insulation is worn away upon being pulled through a length of conduit. On other occasions cables have broken or conduit fittings have been damaged or broken because of the large pulling forces exerted on the cable in attempting to install the latter on a conduit. Also as a result of these large pulling forces, the cable is stretched such that the thickness of the insulation is reduced with resultant reduction in the effectiveness of the insulation.

In order to reduce the pulling force required, pulling boxes are installed at more frequent intervals (in many cases every 100 feet, for example), but this adds to the over-all cost. In some cases electrical code requirements are such that there is a limitation on the number of bends in a run of conduit between outlet and outlet. For example, the National Electrical Code, Article 347–14 provides that for rigid nonmetallic conduit, a run of conduit between outlet and outlet, between fitting and fitting or between outlet and fitting shall not contain more than the equivalent of four quarter bends (360 degrees) total including those bends located immediately at the outlet or fitting.

In other installations, the limit of the length of cable which may be pulled in a run of conduit is limited by the friction from the weight of the cable.

Heretofore, a lubricant in the form of a light cream having dielectric properties, frequently referred to as pulling compound, has been packed at the leading end of the electrical cable just before it was about to be pulled through a conduit. However, the pulling compound tended to dissipate rapidly at the initial end of the conduit run and there was no effective lubrication at the remaining portion of the conduit run.

Accordingly, it is an object of the present invention to provide a device to ameliorate the aforesaid conditions and disadvantages and to provide an improved method and device for installing electrical cable and the like in a conduit.

Another object is to provide means to practice a method of installing electrical cable wherein pulling lubricant is distributed throughout the length of the conduit to reduce the friction as the cable is pulled and to otherwise facilitate electrical cable installation.

Another object is to provide for reducing the pulling forces required to pull a cable through a conduit and for protecting the cable from abrasion as the cable is pulled through a conduit.

Another object is to provide for introducing a source of pulling lubricant at frequent intervals along a run of conduit.

Another object is to provide for distributing pulling lubricant throughout the length of a conduit whereby the lubricant need not be used and distributed in the conduit until the cable is ready to be pulled therethrough.

A further object is to provide for distributing lubricant in a conduit which is to be installed in an inaccessible location (e.g., underground) and in which the electrical cable is not to be placed in the conduit until a future date.

Yet a further object is to provide an insert containing an easily ruptured reservoir, filled with a wire pulling lubricant, which provides fresh lubrication at various desired locations, thus reducing friction and abrasion to the wire and cable.

SUMMARY OF THE INVENTION

The aforesaid objects of the present invention and other objects which will become apparent as the description proceeds, are achieved by disposing a plurality of container means containing a lubricant along a plurality of longitudinally spaced locations along the inside of the conduit, passing a leading portion of said elongated member through said conduit, engaging said container means with said elongated member to cause the container means to release the lubricant therein, and passing said elongated member through said conduit as the released lubricant functions as a lubricant to facilitate passing said elongated member through the conduit.

Numerous other objects and advantages of the invention will become apparent as it is better understood from the following description, which, taken in connection with the accompanying drawings, discloses a preferred embodiment.

In the drawings:

FIG. 1 is a perspective view, partly broken away, of a container means, according to one embodiment of the invention, adapted to be installed in a conduit which is to receive an electrical cable.

FIG. 2 is a sectional view of a conduit in which the container means of FIG. 1 is installed.

FIG. 3 is a sectional view taken along the line 3—3 of FIG. 2.

FIG. 4 is a sectional view of a container means having a sealing gasket at its longitudinal ends.

FIG. 5 is a sectional view of an alternate container having concave longitudinal ends to facilitate centering.

FIG. 6 is a sectional view similar to FIG. 3 but showing a conduit utilizing a non-threaded coupling and showing a brush used as the cables are pulled through the conduit.

DESCRIPTION OF THE PREFERRED EMBODIMENTS

Before explaining the present invention in detail, it is to be understood that the invention is not limited in its application to the details of construction and arrangement of parts illustrated in the accompanying drawings since the invention is capable of other embodiments and of being practiced or being carried out in various ways. Also it is to be understood that the phraseology or terminology employed is for the purpose of description and not of limitation.

Referring to the drawings in which like parts are similarly designated, FIG. 1 shows a container means 10 which comprises, according to one embodiment of the invention, a ring element 12 and two end closures 14, 16 secured to the ring element 12, thereby to define a closed container in which a lubricant 18 is contained. The container means 10 is adapted to be received with a coupling 20. The coupling 20 in turn threadedly receives at 17 and 19 the longitudinal ends of two conduits 22, 24, respectively which are adapted to receive and house one or more electrical cables. The conduits may be metallic or plastic. As will be described in greater detail hereinafter, the container means 10 is adapted to be ruptured in the process of installing the electrical cables through the conduit thereby to release the lubricant into the conduit and lubricate the latter and the cables to reduce the friction therebetween as the cable is pulled through the conduit during installation.

The container means 10 may be formed by joining the aforesaid two closures 14, 16 which may be formed of two sheets of flexible material (e.g. plastic such as polyethylene), to the sides of the ring element 12. The ring 12 may be made of plastic and the outer radial, circumferential edge portions of the two sheets of flexible material 14, 16 are suitably secured to the ring 12 by heat sealing to the end surfaces of the ring 12. Alternatively, the outer radial circumferential edge portions of the two sheets of material 14, 16 may be adhered to the ring 12 by other means such as by using an adhesive. Alternatively, the two sheets of flexible material 14, 16 may be made of other materials such as metallic foil (e.g. aluminum) or a laminate of metallic foil and paper or plastic.

In some installations, for example in laundries, the conduit for the electrical cables must be waterproof. In such installations, the ring 12 may serve as a gasket to provide a watertight seal at the ends of the two conduits 22, 24. In this regard, the two conduits 22, 24 may be threaded into the coupling 20 to the extent of compressing the ring 12, which may be made of plastic, therebetween to provide the watertight seal. Alternatively, a gasket ring 21 of suitable material (e.g. rubber or cork) may be placed on the longitudinal ends of the container means such as shown in FIG. 4.

Frequently, in known conventional installations which do not employ any type of ring between the longitudinal ends of the two conduits in a coupling, the ends of such conduits do not come together or they do not abut one another evenly around the periphery thereof. This results in a gap in the coupling between the two conduit ends and this gap can frequently be troublesome, for example, by catching the end of the snake as the latter is attempted to be pushed through a run of conduit. According to the present invention, the ring 12, which may also serve as a gasket as previously mentioned, also serves to eliminate any gap between the longitudinal ends of the conduits 22, 24 which might otherwise hinder insertion of the snake.

As a further alternate embodiment, the longitudinal ends of the ring 12a in FIG. 5 may have concave recesses whereby the ends of the conduits are adapted to engage coupling.

In a further alternate embodiment the ring 12 may have inner, relatively thin, annular flanges which extend into the ends of conduits 22, 24 so that such flanges cover the longitudinal ends of each conduit 22, 24. In this regard it will be noted that when a length of conduit is cut, the cutting tool tends to leave a sharp edge or burrs on the edges of the cut conduit, particularly the inner edge because the cutting tool cuts radially inwardly. This is true, for example, of a conventional three-ring cutting tool which tends to leave a sharp inner edge on the cut pipe. For this reason, conventional three ring cutting tools are not permitted to be used on many installations because the sharp inner edge will cut or otherwise damage the electrical cable which is pulled through and housed in the conduit. The aforesaid flanges cover the inner peripheral edges of the longitudinal ends of the conduits 22, 24 thereby protecting the electrical cables in the conduits from being cut or otherwise damaged by any sharp edge or burrs on said inner peripheral edges. Because of this protection, conventionally a three ring cutting tool may be used to cut the conduit where heretofore they were not permitted for the reasons stated above.

In a further alternate embodiment the container means may comprise a ring 12 having a plurality of annular tabs extending generally parallel to the axis of the ring 12. The tabs are relatively thin and are adapted to extend into the narrow annular space between the outer walls of the conduits 22, 24 and the inner walls of a nonthreaded coupling which joins the two conduits. Such tabs serve to anchor the ring in place in the coupling between the longitudinal ends of the two conduits.

FIG. 4 further shows an alternate embodiment wherein a pulling cable or rope which is used to pull an electrical cable 32 through a conduit in which two conduit sections 31, 33 are joined by a threadless coupling 35. The coupling 35 may be secured to the end portions of the conduit sections 31, 33 by any suitable means such as, for example, by using an adhesive. A wire brush 34 having a central support 36 is disposed between the pulling cable or rope 30 and the electrical cable 32. It will be seen that as the electrical cable 32 is pulled through the conduit, the brush 34 precedes the electrical cable 32 to break up the container means 10. In this regard it will be appreciated that when the snake is initially passed through the conduit and the snake is used to pull through the pulling cable or rope 30, the container means 10 will be broken by the snake and that the wire or nylon ropes and the brush 34 will further break the container means so that the brush 34 will spread and distribute the lubricant along the longitudinal extent of the conduit.

It will be appreciated that the container means of the present invention may be readily installed at each coupling within a run of conduit. Accordingly, there is assured an adequate distribution of pulling lubricant throughout the length of the conduit. For example, conduits for electrical installations are frequently supplied in 10 foot lengths and a coupling is installed between each such 10 foot length so that there may be a source of pulling lubricant at a minimum of every 10 feet. Where fittings (e.g. albows) are installed, couplings adjacent the fittings may be provided with lubricant containers of the present invention to lubricate the area inside the fittings where the greatest friction is encountered.

In electrical construction, frequently conduits are installed at a facility (e.g. underground or in the walls of a building) in which electrical cables are to be installed at a future date, for example, to provide for expansion. Accordingly, long runs of such conduits are unaccessible. However, according to the present invention, the lubricant container means of the present invention may be installed in the conduit as the latter is installed at the construction site and may be allowed to remain in the conduit in the containers until some future date when the electrical cable is passed therethrough to rupture the containers and release the lubricant.

From the above description it will be seen that there has been described a method and device for installing electrical cable in a conduit which reduces friction, which reduces abrasion and the wear and tear of the electrical cable, which reduces the over-all cost of an electrical installation, which leads towards the reduction in the number of pull boxes and towards reducing the maximum size of cables which may be installed through a particular size conduit, towards a reduction in the number of splices required, towards an increase in the number of turns which may be safely used in a particular run of conduit, and which provides numerous other benefits and advantages heretofore set forth.

It is thought that the invention and many of its attendant advantages will be understood from the foregoing description and it will be apparent that various changes may be made in the form, construction and arrangement of parts of the apparatus mentioned herein and in the steps and their order of accomplishment of the process described herein, without departing from the spirit and scope of the invention or sacrificing all of its material advantages, the apparatus and process hereinbefore described being merely a preferred embodiment thereof.

What is claimed is:

1. Means to lubricate an elongated element to facilitate assembly of said element within said means comprising:
   a plurality of aligned conduit means adapted to receive said element;
   frangible container means having a lubricant therein, disposed between adjacent ends of the conduit means and extending radially within the composite conduit;
   coupling means joining the adjacent ends of said conduit means;
   whereby said container is disposed to be fractured by the leading end of said elongated element passing into the conduit means to thereby release said lubricant and to facilitate assembly of the conduit means and the elongated member.

2. A device according to claim 1 wherein said container means comprises a container made at least partially of a flexible material adapted to be ruptured by said elongated member.

3. A device according to claim 3 wherein said container means comprises a ring element to which end closures are affixed.

4. A device according to claim 3 wherein said ring element is made of plastic.

5. A device according to claim 3 wherein said end closures are made of sheets of plastic film.

6. A device according to claim 5 wherein said end closures are made of a laminate comprising a metallic foil.

7. A device according to claim 1 wherein said container means comprises a cylindrical ring and two generally flat sheets of plastic film affixed to the longitudinal ends of said cylindrical ring whereby said ring and two sheets of plastic film define a closed container in which a lubricant is contained.

8. A device according to claim 6 wherein said sheets of plastic film are circular and are secured at their peripheral edge portions to the longitudinal ends of said cylindrical ring.

9. A device according to claim 1 wherein said container means has an outer diameter which is less than the inner diameter of said coupling, whereby said container means is adapted to be accommodated in said coupling, said conduits having ends in said coupling spaced from one another whereby said container means is accommodated in said space.

10. A device according to claim 1 further comprising a resilient ring on the longitudinal end of said container means, said resilient ring providing a seal between said container means and said conduits.

11. A device according to claim 3 wherein the longitudinal ends of said ring element has a concave, annular surface adapted to be engaged by said conduits to facilitate centering of said container means in said coupling.

References Cited
UNITED STATES PATENTS

| | | | |
|---|---|---|---|
| 559,184 | 4/1896 | Marshall | 43—117X |
| 848,865 | 2/1907 | Storer | 43—117 |
| 2,522,071 | 9/1950 | Tait | 118—404X |
| 2,597,706 | 5/1952 | Couchman | 174—68C |
| 2,666,354 | 1/1954 | Dim et al. | 29—526UX |
| 2,767,239 | 10/1956 | Kennedy | 174—68C |
| 2,924,876 | 2/1960 | Lewis | 29—458 |
| 3,023,599 | 3/1962 | Pellegrini | 118—404X |
| 3,140,958 | 7/1964 | Opotow et al. | 29—526UX |
| 3,467,120 | 9/1969 | Hill et al. | 285—3X |

FOREIGN PATENTS

| | | | |
|---|---|---|---|
| 145,796 | 1938 | Germany | 118—404 |

MORRIS KAPLAN, Primary Examiner

U.S. Cl. X.R.

29—433; 118—408; 138—108; 174—68C; 285—3